(12) United States Patent
Walker

(10) Patent No.: US 9,841,829 B1
(45) Date of Patent: Dec. 12, 2017

(54) EXTENSION ROD ASSEMBLY

(71) Applicant: Ellen Walker, Kendall Park, NJ (US)

(72) Inventor: Ellen Walker, Kendall Park, NJ (US)

( * ) Notice: Subject to any disclaimer, the term of this patent is extended or adjusted under 35 U.S.C. 154(b) by 0 days.

(21) Appl. No.: 15/582,826

(22) Filed: May 1, 2017

(51) Int. Cl.
*G06F 3/033* (2013.01)
*G06F 3/0354* (2013.01)
*F16B 7/00* (2006.01)

(52) U.S. Cl.
CPC ............ *G06F 3/03545* (2013.01); *F16B 7/00* (2013.01)

(58) Field of Classification Search
CPC .............................. G06F 3/03545; F16B 7/00
USPC ........................................................ 345/179
See application file for complete search history.

(56) References Cited

U.S. PATENT DOCUMENTS

| | | | |
|---|---|---|---|
| 4,669,769 A | 6/1987 | Polder, Jr. | |
| 5,458,385 A | 10/1995 | Peeples | |
| 5,901,994 A | 5/1999 | Riddle et al. | |
| 7,344,171 B1 | 3/2008 | McMullan | |
| 7,398,759 B2 | 7/2008 | Todero | |
| D591,121 S | 4/2009 | Buzby et al. | |
| 8,500,180 B2 | 8/2013 | Buzby et al. | |
| 9,238,302 B2 | 1/2016 | Thibodeaux et al. | |
| 2011/0291999 A1* | 12/2011 | Liang | B43K 23/06 345/179 |

OTHER PUBLICATIONS speedpjg https://web.archive.org/web/20160101144600/http://www.thingiverse.com:80/thing:1103544, update posted Jan. 1, 2016, retrieved Jun. 12, 2017.*
reachergrabber.com https://web-beta.archive.org/web/20161104192526/http://reachergrabber.com/folding_reachers.html, Nov. 4, 2016, retrieved Jun. 12, 2017.*

* cited by examiner

*Primary Examiner* — Kent Chang
*Assistant Examiner* — Mark Edwards

(57) ABSTRACT

An extension rod assembly includes a first rod that may be gripped by a user in a vehicle. A second rod is provided and the second rod is hingedly coupled to the first rod. The second rod is selectively positioned in a deployed position having the second rod being oriented colinear with the first rod. In this way the second rod may selectively manipulate an object that is out of reach of the user. The second rod is selectively positioned in a folded position having the second rod being oriented coextensive with the first rod. A stylus is coupled to the second rod engage buttons. A hook is coupled to and extends laterally away from the second rod. The hook is manipulated to engage and selectively move the object.

6 Claims, 4 Drawing Sheets

EXTENSION ROD ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to rod devices and more particularly pertains to a new rod device for reaching an object from a vehicle.

BRIEF SUMMARY OF THE INVENTION

An embodiment of the disclosure meets the needs presented above by generally comprising a first rod that may be gripped by a user in a vehicle. A second rod is provided and the second rod is hingedly coupled to the first rod. The second rod is selectively positioned in a deployed position having the second rod being oriented colinear with the first rod. In this way the second rod may selectively manipulate an object that is out of reach of the user. The second rod is selectively positioned in a folded position having the second rod being oriented coextensive with the first rod. A stylus is coupled to the second rod engage buttons. A hook is coupled to and extends laterally away from the second rod. The hook is manipulated to engage and selectively move the object.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
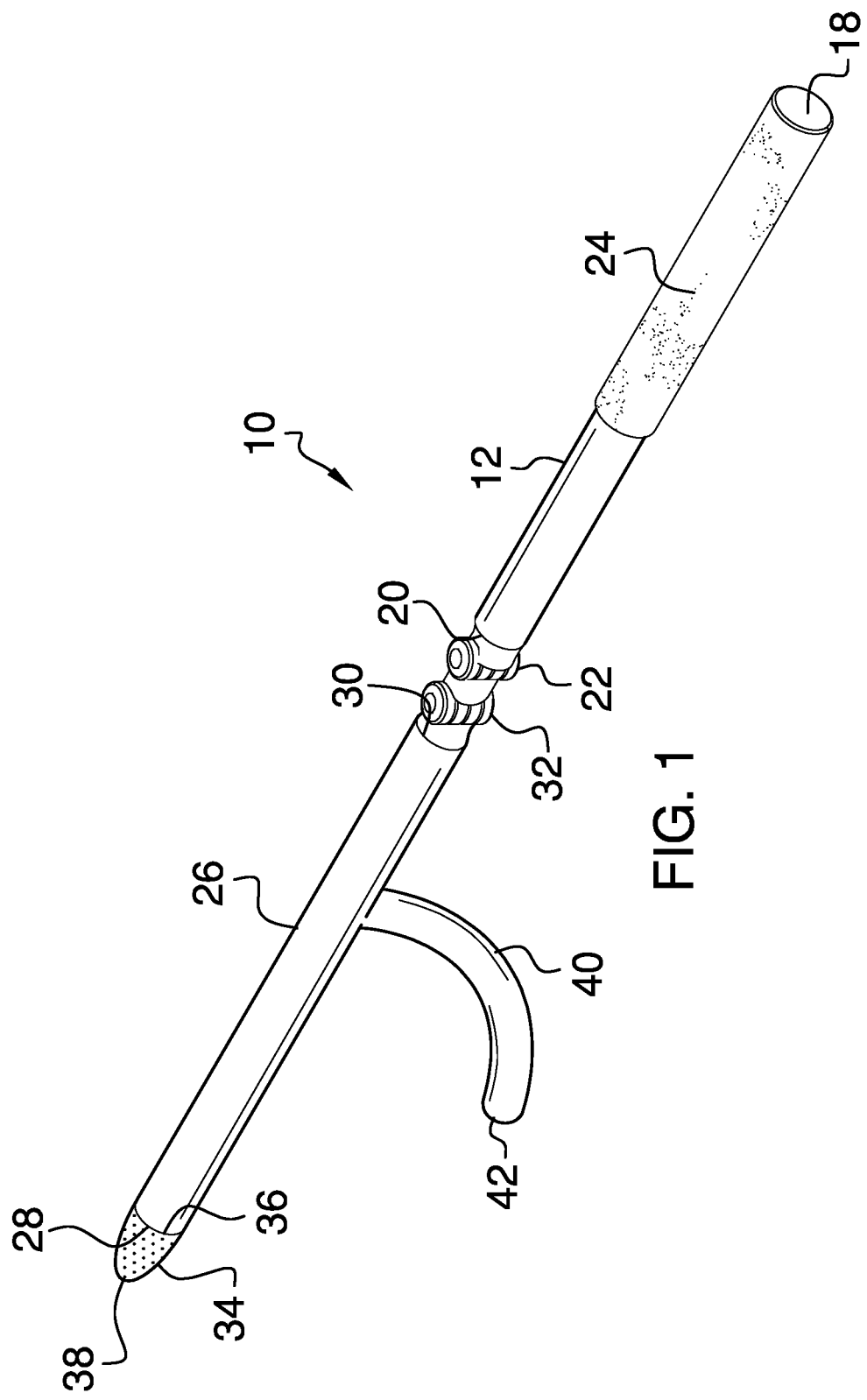
FIG. 1 is a perspective view of an extension rod assembly according to an embodiment of the disclosure.
Figure 2:
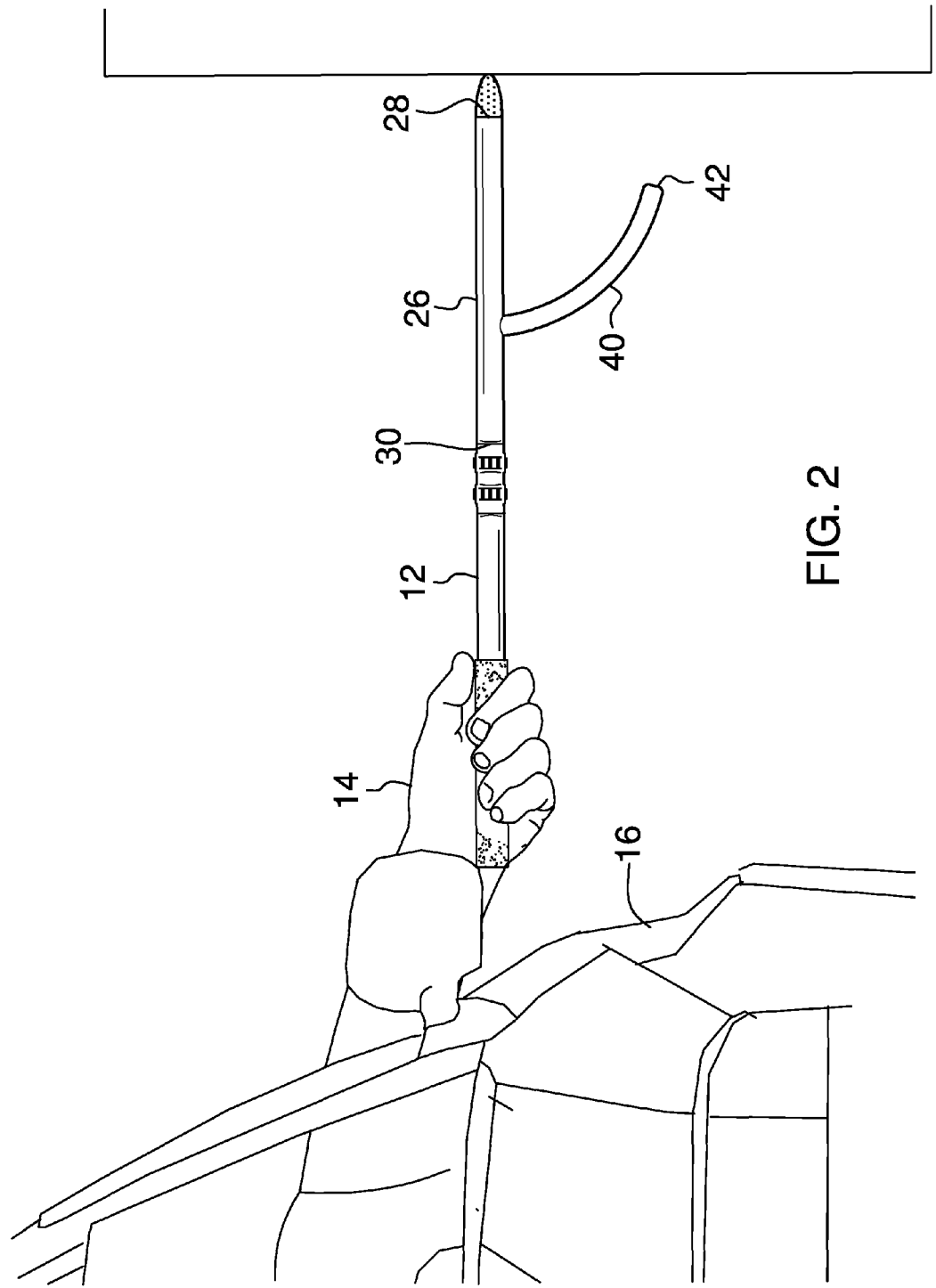
FIG. 2 is a perspective in-use view of an embodiment of the disclosure.
Figure 3:
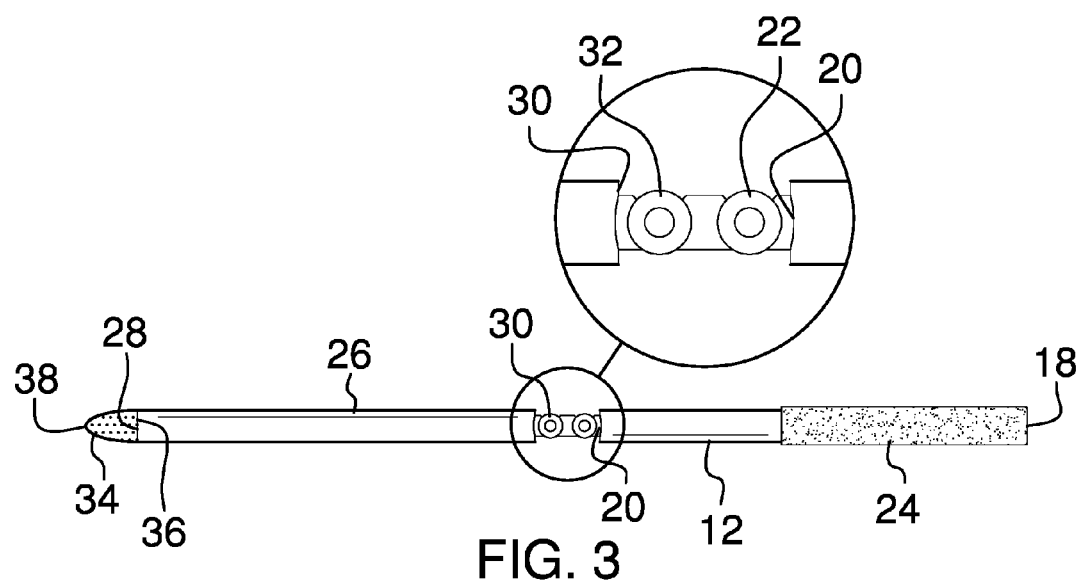
FIG. 3 is a top view of an embodiment of the disclosure.
Figure 4:
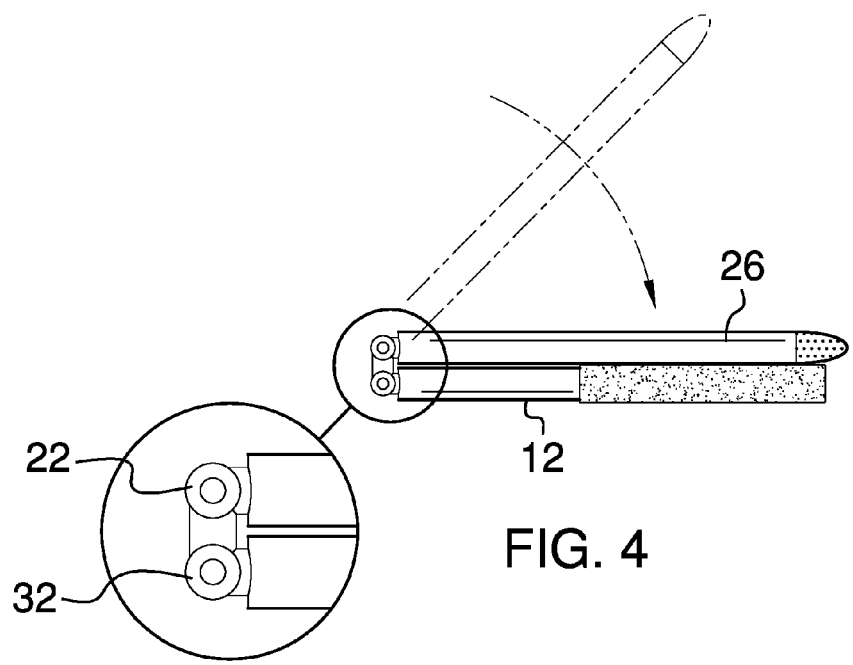
FIG. 4 is a top view of an embodiment of the disclosure in a folded position.
Figure 5:
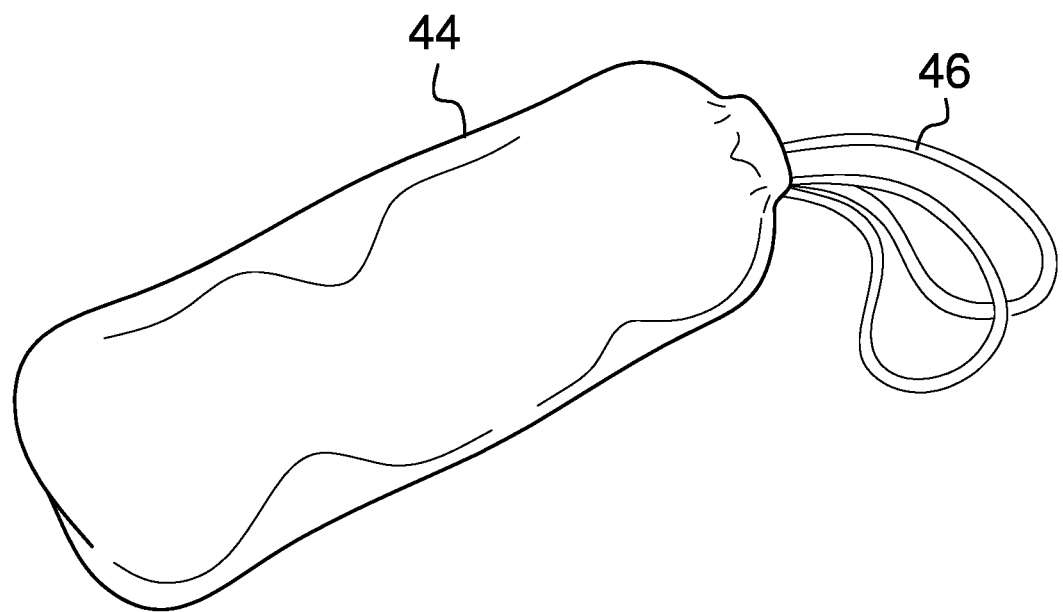
FIG. 5 is a perspective view of a bag of an embodiment of the disclosure.

With reference now to the drawings, and in particular to FIGS. 1 through 5 thereof, a new rod device embodying the principles and concepts of an embodiment of the disclosure and generally designated by the reference numeral 10 will be described.

As best illustrated in FIGS. 1 through 5, the extension rod assembly 10 generally comprises a first rod 12 that is selectively gripped by a user 14 in a vehicle 16. The first rod 12 has a first end 18 and a second end 20 and the first end 18 is selectively gripped. A first hinge 22 is coupled to the second end 20 of the first rod 12 and a grip 24 is positioned around the first rod 12. The grip 24 is aligned with the first end 18 to enhance gripping the first rod 12. Additionally, the grip 24 is comprised of a resiliently compressible material such as rubber or the like.

A second rod 26 is provided and the second rod 26 is hingedly coupled to the first rod 12. The second rod 26 is selectively positioned in a deployed position having the second rod 26 being oriented to be colinear with the first rod 12. In this way the second rod 26 may manipulate an object is out of reach of the user 14. The second rod 26 is selectively positioned in a folded position having the second rod 26 being oriented to be coextensive with the first rod 12. The second rod 26 has a primary end 28 and a secondary end 30 and a second hinge 32 is coupled to the secondary end 30 of the second rod 26. The second hinge 32 is hingedly coupled to the first hinge 22.

A stylus 34 is provided and the stylus 34 is coupled to the second rod 26 to engage buttons. The stylus 34 has a first end 36 and a second end 38 and the stylus 34 tapers to a blunt point at the second end 38 of the stylus 34. The first end 18 of the stylus 34 is coupled to the primary end 28 of the second rod 26 and the stylus 34 may be comprised of a resiliently compressible material. Additionally, the stylus 34 may be comprised of an electrically conductive material thereby facilitating the stylus 34 to manipulate a touch screen.

A hook 40 is provided and the hook 40 is coupled to and extends laterally away from the second rod 26. In this way the hook 40 is selectively manipulated to move the object. The hook 40 is centrally positioned on the second rod 26 and the hook 40 has a distal end 42 with respect to the second rod 26. The hook 40 is curved between the second rod 26 and the"

distal end 42 having the distal end 42 being directed toward the primary end 28 of the second rod 26. A bag 44 is provided and each of the first 12 and second 26 rods is selectively stored in the bag 44. The bag 44 has a drawstring 46 to close the bag 44.

In use, the second rod 26 is positioned in the deployed position and the grip 24 is gripped. The first rod 12 is manipulated to facilitate the stylus 34 to engage a touch screen on an ATM or other similar device when the user 14 is in the vehicle 16. In this way the touch screen may be manipulated without exiting the vehicle 16. The second rod 26 is additionally selectively positioned to manipulate a remote object with respect to the vehicle 16 without exiting the vehicle 16. The remote object may be a call button in a pharmacy drive up or any other remote object. Moreover, the first rod 12 is manipulated to facilitate the second rod 26 to engage a control in the vehicle 16 that is out of reach of the user 14 such as a gas tank release or the like. The first rod 12 is additionally manipulated to facilitate the hook 40 to engage a door on the vehicle 16 to facilitate the user 14 to close the door without leaning. In this way the second rod 26 and the hook 40 assist a physically limited user 14 to perform activities from a vehicle 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An extension rod assembly being configured to be manipulated from a vehicle thereby facilitating an object to be remotely manipulated from the vehicle, said assembly comprising:
    a first rod being configured to be gripped by a user in the vehicle, said first rod having a first end and a second end:
    a grip being positioned around said first rod, said grip being aligned with said first end, said grip having a length such that said grip is configured to be grasped to enhance gripping said first rod, said first rod extending away from said grip such that said second end of said first rod is extended from said grip:
    a second rod being hingedly coupled to said first rod by a double hinge mechanism wherein said second rod is selectively positionable in a deployed position having said second rod being oriented to be colinear with said first rod wherein said second rod is configured to manipulate the object, said second rod being selectively positionable in a folded position having said second rod being oriented to be parallel to and coextensive with said first rod;
    a stylus being coupled to said second rod, said stylus being electrically conductive wherein said stylus is configured to engage and operate a touch screen; and
    a hook being coupled to and extending laterally away from said second rod, wherein said hook is centrally positioned on said second rod, wherein said hook is configured to be manipulated to selectively engage and move the object.

2. The assembly according to claim 1, further comprising said double hinge mechanism including a first hinge being coupled to said second end of said first rod.

3. The assembly according to claim 2, further comprising:
    said second rod having a primary end and a secondary end; and
    said double hinge mechanism including a second hinge being coupled to said secondary end of said second rod, said second hinge being hingedly coupled to said first hinge.

4. The assembly according to claim 3, wherein said stylus has a first end and a second end, said stylus tapering to a blunt point at said second end, said first end being coupled to said primary end of said second rod.

5. The assembly according to claim 3, said hook having a distal end with respect to said second rod, said hook being curved between said second rod and said distal end having said distal end being directed toward said primary end of said second rod.

6. An extension rod assembly being configured to be manipulated from a vehicle thereby facilitating an object to be remotely manipulated from the vehicle, said assembly comprising:
    a first rod being configured to be gripped by a user in the vehicle, said first rod having a first end and a second end, said first end being configured to be gripped;
    a grip being positioned around said first rod, said grip being aligned with said first end wherein said grip is configured to enhance gripping said first rod;
    a second rod being hingedly coupled to said first rod by a double hinge mechanism wherein said second rod is selectively positionable in a deployed position having said second rod being oriented to be colinear with said first rod wherein said second rod is configured to manipulate the object, said second rod being selectively positionable in a folded position having said second rod being oriented to be parallel to and coextensive with said first rod, said second rod having a primary end and a secondary end;
    said double hinge mechanism including a first hinge being coupled to said second end of said first rod and a second hinge being coupled to said secondary end of said second rod, said second hinge being hingedly coupled to said first hinge;
    a stylus being coupled to said second rod, said stylus being electrically conductive wherein said stylus is configured to engage and operate a touch screen, said stylus having a first end and a second end, said stylus tapering to a blunt point at said second end, said first end being coupled to said primary end of said second rod; and
    a hook being coupled to and extending laterally away from said second rod wherein said hook is configured to be manipulated to selectively move the object, said hook being centrally positioned on said second rod, said hook having a distal end with respect to said second rod, said hook being curved between said second rod and said distal end having said distal end being directed toward said primary end of said second rod.

* * * * *